April 19, 1966  E. F. LINK  3,246,926

SEATING ARRANGEMENT FOR TRACTORS

Filed April 19, 1965

Inventor:
Erwin F. Link
By Melburn E. Laundry
Atty.

United States Patent Office 3,246,926
Patented Apr. 19, 1966

3,246,926
SEATING ARRANGEMENT FOR TRACTORS
Erwin F. Link, Lansing, Ill., assignor to International Harvester Company, Chicago, Ill., a corporation of New Jersey
Filed Apr. 19, 1965, Ser. No. 449,155
8 Claims. (Cl. 297—93)

This invention relates to a vehicle seat arrangement and more particularly to a flipover or reversible seat arrangement for use with a vehicle having forward and rear controls requiring an operator to face alternatively to the front and rear of the vehicle to operate the controls.

In conventional tractors equipped with backhoe or hydraulic digging equipment, controls for the digging equipment are located a distance to the rear of the vehicle from the location of the main tractor controls. The backhoe equipment is attached to the rear of the vehicle and the operator of the vehicle customarily controls the backhoe equipment by reversing his position and facing to the rear of the vehicle. Usually, the controls and floor panel of the backhoe equipment are slightly elevated with respect to the tractor controls and floor board.

In some prior art tractors equipped with backhoes, two separate seats were provided for the operator with a first seat facing forwardly for use by the operator in driving the tractor and operating equipment at the forward end thereof and with a second or backhoe seat facing to the rear of the tractor for use by the operator in operating the backhoe equipment. In other tractor seating arrangements, a single vehicle seat was provided with a vertically extending tubular floor mount utilized to permit rotation of the seat 180 degrees about a vertical axis for use facing forwardly or rearwardly. In other tractors, two such vertically extending tubular floor mounts were provided at longitudinally spaced locations with a first and lower tube mount provided for use of the seat as a tractor seat and with a second relatively higher tube mount spaced to the rear of the first mount for use of the seat as a backhoe seat. Thus, when it was desired to use a seat previously positioned for operation of the main tractor controls as a backhoe seat, it was necessary to remove the seat from its tube mount, turn it 180 degrees about and place it on a second tube mount on the backhoe floor panel for use as a backhoe seat. Unfortunately, these various seat arrangements have not been completely acceptable due to, among other things, considerations of cost and inconvenience of use.

Thus, it is an object of the present invention to provide an improved vehicle seating arrangement.

It is another object of the invention to provide a simplified, readily reversible vehicle seating arrangement permitting use of the same seat in operating alternatively forward and rear equipment.

It is another object of the invention to provide a simplified seating arrangement for a tractor or other vehicle having equipment to be controlled by an operator facing alternately forwardly or rearwardly where the seat converts readily and selectively for use in operation of either the forward tractor controls or for the rear backhoe equipment.

These and other objects of the invention will become apparent from the following description taken in conjunction with the appended claims and drawings, wherein:

Figure 1:
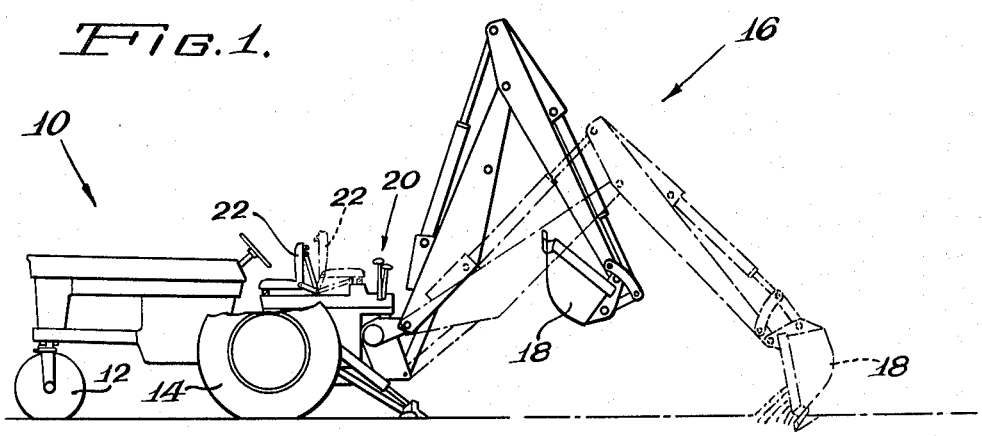
FIG. 1 is a side elevational view of a tractor having a backhoe attachment with the improved seating arrangement shown in full line facing forwardly for operation of the tractor forward controls and shown in dotted line in digging position facing rearwardly for operation of the backhoe equipment.
Figure 2:
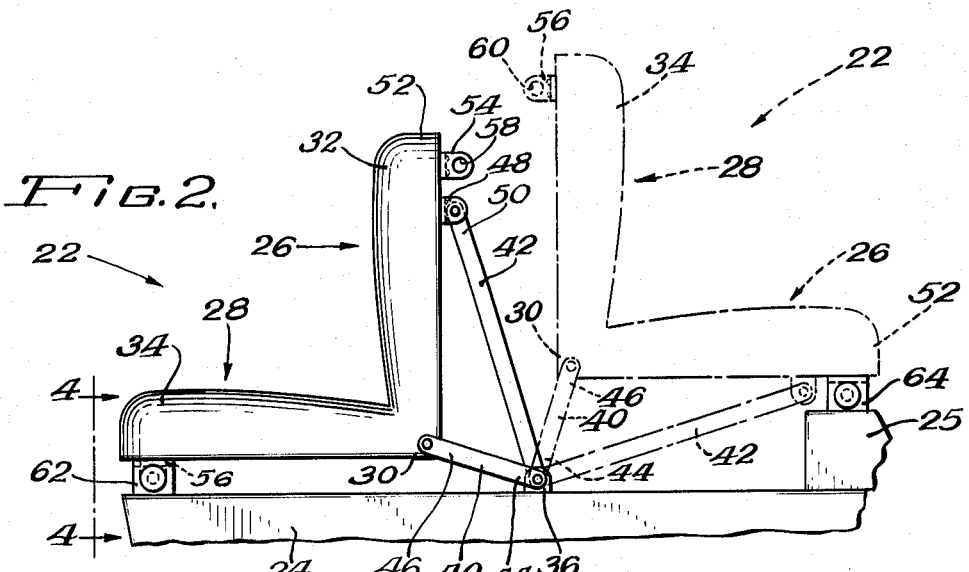
FIG. 2 is a side elevational view on an enlarged scale of the seating arrangement illustrated in FIG. 1 with a seat shown in full line facing to the left in a forward facing position as it would be for operation of the forward tractor controls and with the seat shown in dotted line facing to the right in a rearwardly facing position as it would be for operation of the backhoe equipment.

Referring to the drawings, FIGS. 1 and 2 show a tractor designated generally by the numeral 10 having a front wheel 12 and rear wheels 14 supporting a front and rear end of the tractor, the tractor including a backhoe or hydraulic digging attachment designated generally by the numeral 16 positioned at the rear end of the vehicle. The backhoe equipment 16 is shown in full line in FIG. 1 in transport position and is shown in dotted line in digging position. The backhoe equipment is conventional in nature forming no part of the present invention and includes a digging bucket 18 and various control levers 20 for operation of the backhoe.

In accordance with the invention, a reversible flipover seat 22 is provided, pivotally mounted to a horizontal vehicle base 24 and adapted for use by an operator of the vehicle facing alternatively forwardly or rearwardly as best seen in FIG. 2. The seat 22 is generally L-shaped in cross section and includes first and second identical seat portions or elements 26, 28 fixedly secured together at a right angle junction 30. The specific manner in which the seat is formed is conventional in nature and forms no part of the present invention but by way of example includes a layer of stiff board over a basic L-shaped metallic frame, not shown, of strap metal or the like, each of the seat portions 26, 28 including a cushion 32, 34 respectively secured to the frame, the seat portions 26, 28 thus being adapted to serve selectively as either a seating portion or a backrest portion of the seat. Thus, when the seat is positioned facing rearwardly or to the right, as viewed in FIG. 2, the first seat portion 26 serves as a seating portion to support an operator's weight and the second seat portion 28 serves as a backrest.

With the seat in the position shown in FIG. 2 facing forwardly to the left as viewed in the drawing for operation of the main tractor controls, the function of the seat portions 26, 28 is reversed and the portion 26 is positioned generally vertically extending to serve as a backrest with the portion 28 extending in a generally horizontal direction and serving as a seating portion to support an operator's weight.

A pair of transversely spaced pivot brackets 36 are secured to the tractor base 24, as by welding, the pivot brackets 36 being aligned transversely of the base and being positioned intermediate a forward position of the seat as illustrated in full line in FIG. 2 and a rearward facing position of the seat as indicated in dotted line in FIG. 2. The pivot brackets 36 serve as a base or support for pivot means supporting the seat to be hereafter described. The seating arrangement includes first and second pivot means comprising first and second pairs of transversely spaced support or pivot arms 40, 42 pivotally connected to the pivot brackets 36 as by means of a pin 38 extending transversely through the pivot brackets 36 for pivoting of the arms 40, 42 about the pins as a horizontal axis extending transverse the tractor.

Figure 3:
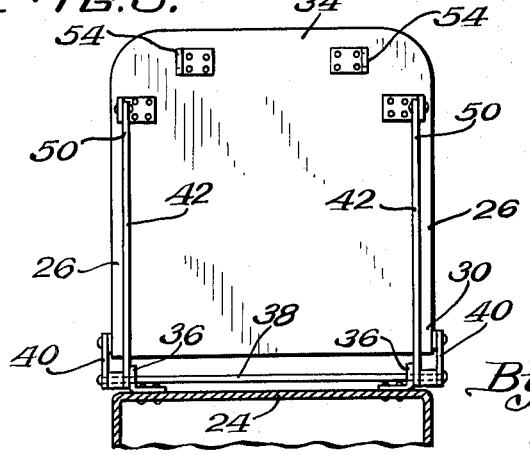
FIG. 3 is a rear elevational view of the seating arrangement of FIG. 2.

The first and second pivot arms 40, 42 are formed of strap metal or the like with the first pair of pivot arms 40 being relatively shorter than the second pair of pivot arms 42 and including first end 44 pivotally arranged about the pin 36 and second ends 46 connected to the metallic seat frame at the junction 30 on both sides of the seat. The pivot arms 42 are pivotally connected to the pivot brackets 36 at one end and are connected at outer ends 50 to seat brackets 48 secured to the rear of seat portion 26, the seat brackets 48 being mounted one on either side of the seat on the back of seat portion 26, as best seen in FIG. 3, at a position intermediate the junction 30 and an outer end 52 of seat portion 26 preferably at a position between a longitudinal midpoint of portion 26 and its outer end 52 adjacent member 34. Pairs of support members 54, 56 are mounted to the backs of seat portions 26, 28 respectively at their outer ends, the support members 54, 56 having openings 58, 60 therein for receipt of locking means to be hereafter described to maintain that particular seat portion in a position generally parallel to the tractor floor board.

Figure 4:
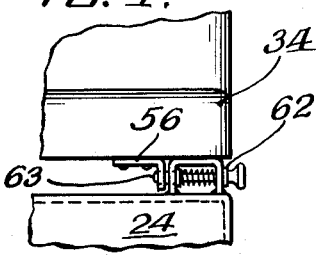
FIG. 4 is a sectional view taken along lines 4—4 of FIG. 2.

Locking support means for the seat are provided to support a front end of the seat and lock it into position, the locking support means comprising conventional spring latches 62, 64 respectively mounted on the base 24 of the tractor and on a backhoe panel 25, the latches 62, 64 being positioned in line with adapted to receive the support brackets 56, 58 respectively. The spring latch 62 FIG. 4 is utilized when the tractor seat is in position for operating the main tractor controls; and the spring latch 64, FIG. 2 in conjunction with the support bracket 58, is utilized when the tractor seat is in position for operating the backhoe. The spring latches include a spring loaded manually retractable pin 63 adapted to slide into position into opening 58 or 60 of the brackets 54, 56 to lock the seat into position.

Having now described the invention, its operation should be clear. However, for purposes of a better understanding thereof, the manner in which the tractor seat operates will now be briefly explained. The tractor seat 22 embodying the invention is generally L shaped in cross section including two identical portions 26, 28 adapted to serve selectively as a seating portion or as a backrest portion of a tractor seat. The tractor seat is pivotable about a pivot bracket having a horizontal pivot pin therein, the pivot pin being positioned transverse the tractor frame and to the rear of the tractor seat when the seat is positioned facing forwardly with respect to the tractor front end. The tractor seat is pivotable in a vertical plane about a horizontal axis comprising the pin 38 by flipping or rotating the seat over 180 degrees to a position where the seat faces rearwardly for operation of backhoe equipment attached to the rear of the tractor. With the seat flipped over to the reverse position, the portion 26 of the seat which had previously served as a backrest portion now serves as a seating portion; and the portion 28 of the seat which had previously served as a seating portion now serves as a cushioned backrest.

Two pairs of pivot arms 40, 42 are provided, both being pivotally connected at first ends to the pivot bracket 36, with the shorter pair of pivot arms 40 being connected pivotally at their second ends 46 on either side of the seat at the angle or junction 30 of the seat frame. The second pair of pivot arms 42 are relatively longer than the first pair of pivot arms 40 and are connected pivotally at their second end 50 to the back of the seat portion 26. The pivot arms are thus adapted so the arms 40, 42 act as backrest support arms to reinforce the seat against sudden rearward thrust against the portion 26 serving as a backrest when the seat is in forward position, FIG. 2 for operating the main tractor controls. In this forward position the longer arms 42 support more of the weight of the operator than the shorter arms 40, with the shorter arms 40 serving to brace the seat into position with seating portion 28 horizontal.

When the seat is reversed, that is, in a rear position, facing to the right in FIGS. 1 and 2 the tractor is usually in a stationary state, at rest, for operation of the digging equipment shown in digging position in dotted line, FIG. 1, at the rear of the tractor. In this position, backrest reinforcement is not required and both sets of arms 40, 42 serve as bracing elements to support the seat portion 26 serving as a seating element.

The pivot arms 40, 42 may be seen to form a seat supporting triangle connected to the seat portion 26 along a base of the triangle and pivotally connected to the support bracket 36 at a constant predetermined acute angled vertex. Thus, the triangle maintains the seat in a predetermined position with respect to a horizontal axis of rotation at the bracket 36. The relative lengths of the pivot arms 40, 42 may be adjusted with respect to one another to permit the seat to be used on various combinations of tractor and backhoe equipment and to permit the seating portion serving as a backrest to be substantially vertical and the other portion serving as seating portion to be substantially horizontal when the seat is in position either for driving the tractor or for operating the backhoe. Since the backhoe floor panel and backhoe controls are usually at a relatively higher elevation then the tractor floor board and main controls for operating the tractor, the relative lengths of pivot arms 40, 42 are adjusted as in FIG. 2 to ensure that the seat element serving as a seating portion is horizontal in either the forward transport or rear digging position.

Since modifications of the details of the structure as illustrated are contemplated, the invention should be limited only by the scope of the appended claims.

The invention is claimed as follows:

1. In a vehicle having a front and rear end, a seat base and a first set of controls for operation of the vehicle and having hydraulic digging equipment attached to a rear end of said vehicle, said digging equipment including a second set of controls spaced rearwardly of said first set of controls a distance sufficient to accommodate an arrangement for a vehicle seat for said vehicle comprising: an L shaped seat including first and second seat members fixedly secured together in a right angle junction, said first and second seat members each having a junction end secured together at said junction and each having a far end spaced from said junction; first pivot means pivotally connecting said seat at said junction to said base; and second pivot means arranged at an acute angle to said first pivot means and having first and second ends, said second pivot means being pivotally connected at said first end to said base at the same position as said first pivot means and being connected to one of said first and second seat members at said second end at a position intermediate said junction and said far end of said seat member; said seat thus being adapted for use selectively in first or second positions, said seat in said first position facing forwardly and having said first frame member generally parallel to the base serving as a seating portion and said second member serving as a backrest portion of said seat, said seat being pivotable from said first position about a horizontal transverse axis on said base to a position 180 degrees in a horizontal plane removed from said first position into a second position with said seat facing rearwardly, said seat in said second position having said first member serving as a backrest portion of said seat and said second member serving as a seating portion; and means for maintaining the seat in said selected positions.

2. A reversible seat for a vehicle, said seat being selectively positionable in first or second positions, said vehicle including a base, said seat comprising:
  first and second seat members fixedly secured together in a right angle junction, said members each having a far end spaced from said junction; first seat support means having a predetermined length and having first and second ends, said seat support means being connected pivotally at said first end to said floor board at a predetermined pivot position, said second end being connected to said seat adjacent said junction; second seat support means having first and second ends and being relatively longer than said first seat support means, said second seat support means being connected pivotally at said first end to said base at said pivot position and being connected at said second end to said first seat member at a position thereon intermediate said junction and said far end, said pivot position being located rearwardly of and spaced apart from said seat when in said first seat position, said first and second seat support arms permitting said seat to be flipped upwardly and over about a horizontal axis extending through said pivot position to said second position 180 degrees in a horizontal plane removed from said first position, said first seat member in said second position being generally parallel to said base and positioned relatively higher than said second seat member with said seat in said first position; and means for maintaining said seat selectively in said first and second positions.

3. A reversible seat for a vehicle, said seat having a front and rear end, said vehicle having associated vehicle controls positioned forwardly of said seat with respect to a front end of said vehicle, said vehicle having a substantially horizontal base for said seat and including first seat support means adapted to support a front end of said seat, said vehicle having second seat support means mounted on said base and positioned rearwardly of said first seat support means, said second seat support means being adapted to support a rear end of said seat, said first and second seat support means being positioned respectively extending generally transverse to said vehicle, said seat comprising:

first and second seat members fixedly secured together in a right angle seat junction, said members each having a far end spaced from said junction and adapted to serve selectively as a seat front end; a first pair of arms having first and second ends, said first ends being pivotally connected to said second seat support means said second arm ends being connected to said seat junction; a second pair of arms having first and second ends and being relatively longer than said first arms, said second pair of arms being connected pivotally at said first ends to said second seat support means and being connected at said second ends to said first seat member at a position intermediate said junction end and said far end, said first and second pair of arms being positioned rearwardly of and spaced apart horizontally from said seat when said seat is in a first position facing forwardly to support an operator for operating said vehicle controls, said first and second pair of arms defining an acute angle therebetween and permitting said seat to be rotated 180 degrees from a first position about a horizontal axis extending transverse said vehicle through said second seat support means to a second position where said seat faces rearwardly and said first seat member is parallel to said tractor vehicle base and positioned relatively higher than said second seat member with said seat in said first position; and means to maintain said seat selectively in said first and second positions.

4. A reversible seat having a first seating member and a second seating member being fixedly joined together at a right angle junction; a base; a pair of first support elements being pivotally connected at first ends at a pivot point on said base and being connected at second ends to opposite sides of said seat at said right angle junction; a pair of second support elements being relatively longer than said first support elements and being pivotally connected at first ends to said base at said pivot point and being connected at second ends to said first seating member, said seat being selectively movable from a first position where said seat faces in a first direction and said second seating member is generally parallel to said base with said second support elements being adapted to support said seat against rearwardly directed thrusts against said seat, said second seating position being with said seat facing in a second direction opposite to said first direction with said second support element being positioned under said first seating member.

5. The seat of claim 4 wherein said first and said pairs of support elements define therebetween a support triangle having a base comprising said second ends of said support elements secured to said first seating member, said support triangle with said seat in said first position being adapted to resist horizontally rearward and vertically downward seat thrust forces, said support triangle with said seat in said second position being adapted to resist predominantly vertically downward seat thrust forces; and means for maintaining said seat fixedly in said first and second seating positions.

6. A reversible seat having a first seating member and a second seating member having first and second ends and being fixedly joined together at said first ends at an angular junction; a base; first support means having first and second ends and pivotally connected at said first ends to said base and being connected at said second ends to said seat at said junction; second support means having first and second ends and being relatively longer than said first support means, said second support means being pivotally connected at said first ends to said base in line with said connection of said first ends of said first support means to said base and being connected at said second ends to said first seating member at a position intermediate said junction and said second end of said seating member, said first and second support means defining an acute angle therebetween, said seat being selectively movable from a first position wherein said seat faces in one direction and said first seating member is generally horizontal with the apex of said acute angle spaced rearwardly from said junction to a second position with said seat facing in an opposite direction with said first and second support means being positioned under said first support member.

7. For a vehicle having a front end and a rear end and a floor board and having associated hydraulic digging equipment attached to the rear end of said vehicle, said digging equipment including a platform being generally parallel to said floor board and at a relatively higher elevation than said floor board, a seating arrangement comprising:

a seat having first and second seating members being fixedly joined together at a right angle junction, said seating members each having a far end spaced from said junction; first pivot arms having first and second ends, said first ends being connected to said seat at said junction, said arms being pivotally connected at said second ends to a pivot position on said floor board, said seat being pivotable about said floor board pivot position as a horizontally extending transverse axis of said vehicle to permit use of said seat selectively in first and second positions, said first position of said seat facing forwardly with said first seating member serving as a seat backrest and said second seating member serving as a seating portion thereof, said pivot position being located rearwardly of said seat in said first position, said seat in said second position for operation of said digging equipment facing rearwardly with said first seating member arranged generally parallel to said floor board, said pivot position being spaced forwardly of said seat in said second position; second pivot arms being relatively longer than said first pivot arms and having first and second ends, said second pivot arms being connected pivotally at said second ends to said floor board at said pivot position and being connected at said first ends to said first seating member at a position intermediate a midpoint of said seating member and said far end, said first and second pivot arms defining an acute angled seat supporting triangle therebetween serving to reinforce said seat in said first position against sudden rearward thrusts and serving to support vertical loads imposed upon said seat in said second position, said seat supporting triangle maintaining the seat members in a predetermined position with respect to said pivot position.

8. In a vehicle having first and second sets of controls for operation respectively of said vehicle and for operation of digging equipment attached to a rear portion of said vehicle, said first controls being positioned forwardly of an associated vehicle seat, said second controls for operation of said digging equipment being positioned rearwardly of said vehicle seat, said vehicle having a floor board, said digging equipment having an equipment platform generally parallel to said floor board but at a relatively higher elevation, a seating arrangement for said vehicle seat comprising:

first and second seat members each having transversely spaced sides, said members being fixedly joined together at a right angle junction, said seat members each having a far end spaced from said junction; first and second seat support means secured respectively to said first and second seat members at said far ends thereof, first pivot arms being pivotally connected at first ends to said seat on either side of the seat at said junction and being pivotally connected at second ends to a pivot axis position on said floor board, said seat being selectively pivotable about said pivot axis position on said floor board functioning as a horizontal axis extending transverse the tractor to permit use of said seat selectively in first and second seat positions, said first position of said seat facing forwardly with said first seating member serving as a seat backrest, and said second seating member serving as a seating portion thereof, said second seat support means being in contact with said floor board, said seat in said second position having said first seating member generally parallel to said floor board with said first seat support means in supported contact with said equipment platform and with said seat facing rearwardly, said pivot axis position being located rearwardly of said seat in said first seat position and relatively forwardly of said seat in said second seat position, said second pivot arms being relatively longer than said first pivot arms and being connected pivotally at first ends to said floor board at said pivot axis position and being connected at second ends to said first seating member at a position intermediate said junction and said far end of said first seating member, said first and second pivot arms defining an acute angle therebetween to maintain said seat in a predetermined position relative to said pivot axis position, said second seating member in said first seat position being relatively lower in elevation than in said second seat position.

References Cited by the Examiner

UNITED STATES PATENTS

| | | | |
|---|---|---|---|
| 130,011 | 7/1872 | Brooke | 297—93 |
| 181,571 | 8/1876 | Gardner | 297—93 |
| 802,519 | 10/1905 | Long | 297—93 |
| 1,959,696 | 5/1934 | Todd et al. | 297—95 |
| 2,784,768 | 3/1957 | Holopainen | 297—93 |
| 2,858,880 | 11/1958 | Fox | 297—93 |
| 2,986,200 | 5/1961 | Nobile | 297—327 |
| 3,162,481 | 12/1964 | Gaylor | 5—37 X |

FOREIGN PATENTS 289,852   6/1914   Germany.

FRANK B. SHERRY, *Primary Examiner.*

J. T. McCALL, *Assistant Examiner.*